Feb. 19, 1924.
F. E. SMALL
1,484,578
PISTON PACKING
Filed Jan. 21, 1922    2 Sheets-Sheet 2
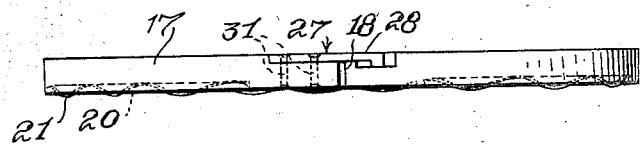
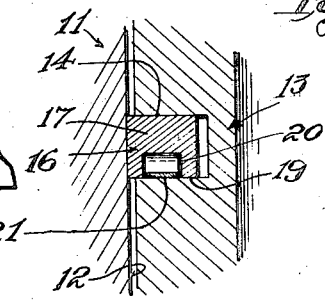
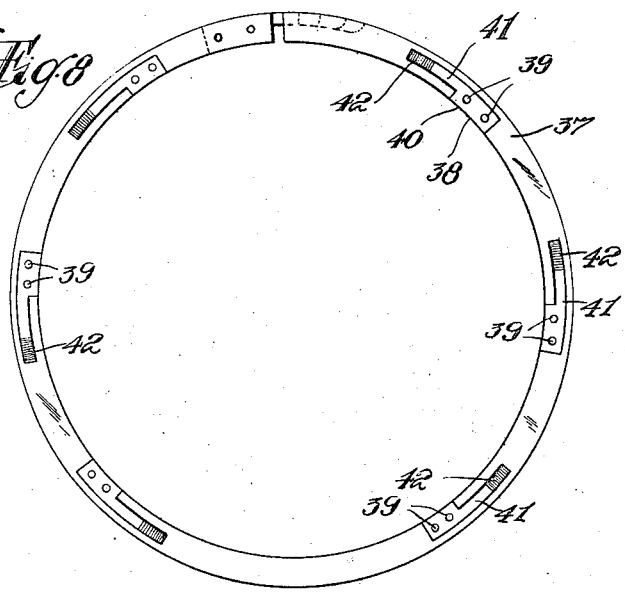
INVENTOR
Frank E. Small
BY
Edward M. Evarts
his ATTORNEY Patented Feb. 19, 1924.

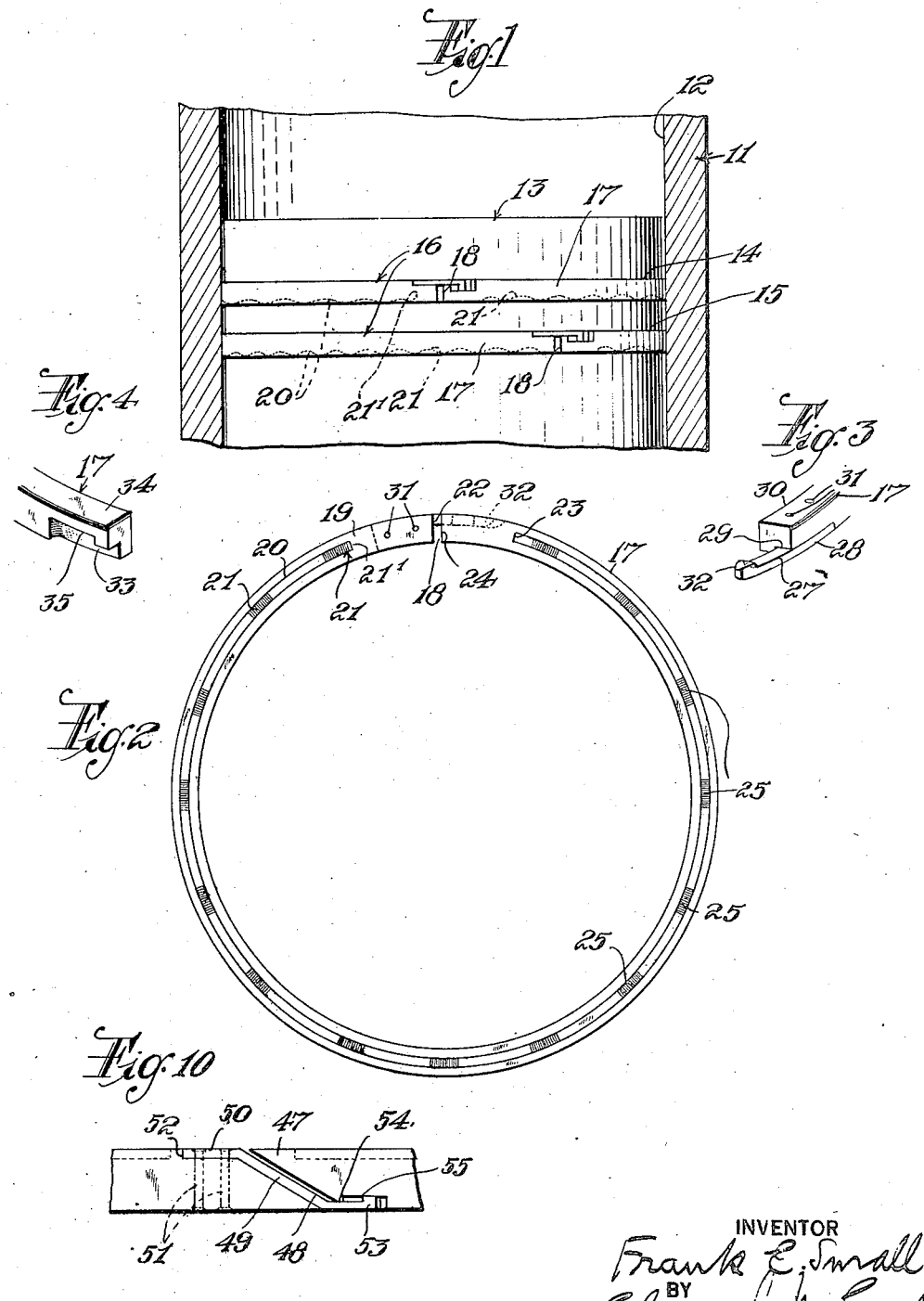

1,484,578

UNITED STATES PATENT OFFICE.

FRANK E. SMALL, OF JAMAICA, NEW YORK.

PISTON PACKING.

Application filed January 21, 1922. Serial No. 530,751.

*To all whom it may concern:*

Be it known that I, FRANK E. SMALL, a citizen of the United States, and a resident of Jamaica, Queens County, New York, have invented an Improvement in Piston Packings, of which the following is a specification.

My present invention relates to piston packings particularly suited for use in the grooves of pistons for the cylinders of internal combustion engines and the like. It is an object of the present invention to provide a piston packing of the character referred to which, while adapted to expand into contact with the bore of the cylinder by its own resiliency, is at the same time provided with means for maintaining the packing within the piston groove under such conditions that there is little or no possibility of the packing creeping within its groove and thus unduly wearing the packing and its groove, with the undesirable consequences resulting therefrom. It is a further object of the present invention to provide a piston packing which, while simple in construction and cheap to manufacture, may be readily and conveniently shipped with less likelihood of becoming dislodged from its groove, and which shall at the same time be efficient in operation and shall give long use, with resulting economies in repairs, replacement of parts, and increase of fuel efficiency.

By way of example, I shall in the accompanying specification set forth, and in the annexed drawings show, several illustrative embodiments of my present invention, it being clearly understood, however, that my invention is not limited to the particular embodiments thereof which are herein set forth for purposes of illustration only.

Referring to said drawings,

Figure 1 is a view in longitudinal section, partly in elevation, of the cylinder and cylinder bore showing the piston provided with two grooves in which are positioned two piston packings made in accordance with one embodiment of the present invention;

Figure 2 is a bottom plan view of the piston packing shown in Figure 1;

Figures 3 and 4 are fragmentary views in perspective and in inverted position of one form of locking device that may be applied to the ends of the packing adjacent the split in the same;

Figure 5 is a side elevation of said packing;

Figure 6 is a bottom plan view of one form of spring that may be used in connection with the packing illustrated in the figures of the drawing referred to above;

Figure 7 is a longitudinal sectional view, on an enlarged scale, showing the packing within the piston groove and in contact with the cylinder bore;

Figure 8 is a bottom plan view of a second embodiment, showing a different arrangement of springs;

Figure 9 is a perspective view of one of the springs used in connection with the embodiment shown in Figure 8; and Figure 10 is a side elevation, in inverted position, of a modified form of locking means.

Before describing in detail the foregoing illustrative embodiments of the present invention, it may be desirable briefly to point out the defects of the prior art relating to piston packings making use of spring means for maintaining the packings under spring pressure within their respective grooves. It has been customary hitherto, to provide such a packing made up of several separable parts. Furthermore, the packing is so related to the groove intended to receive the same that it does not fill the width of said groove and thus leaves room for play between the packing and the groove, thus rapidly wearing out the same. This construction is moreover expensive, and there is a tendency for the spring used with such constructions to jump out of the piston groove, especially when the piston is removed from its cylinder, which also makes these rings difficult to ship and to assemble.

With still other types of piston packings using springs for maintaining the same under spring pressure within their grooves, these springs are to be arranged and the packing so constructed as to render the device of questionable practicability, while at the same time making the same expensive to manufacture and difficult to ship and assemble.

The foregoing disadvantages are largely, in fact almost entirely, overcome by the present invention.

Referring now to the embodiment of the invention shown in Figures 1 to 7, inclusive, of the drawings, 11 indicates the cylinder of an internal combustion engine or the like, such cylinder being provided with the usual bore 12. Within the cylinder and mounted for reciprocation therein in the usual manner, is a piston 13 provided with the usual grooves 14 and 15.

Mounted within the piston grooves are the packings, generally designated by reference character 16. In the form illustrated, each packing 16 comprises a ring 17 which is preferably made of resilient material and is split, as at 18, so as to be adapted to expand into contact with the bore of the cylinder by its own resiliency. It will be noted that the width of the packing ring 17 is preferably, as shown, substantially the same as the width of the groove within which the packing is placed. By this arrangement the packing fits snugly within its groove, thus leaving little or no room for play, with consequent wearing of the packing and of the corresponding piston groove.

Associated with the split ring are means, preferably spring means, for maintaining the ring under pressure, preferably spring pressure, within its groove. For this purpose, I may provide the lower face 19 of the ring 17 with a substantially annular groove 20 which is adapted and designed to receive a spring 21 for exerting the desired spring pressure on the ring to maintain the same within its groove. It will be noted that the groove 20 terminates at a point 21' short of the end 22 of the split ring, and terminates also at the point 23 short of the other end 24 of said ring.

While various constructions of springs may be used for the desired purpose, I prefer to use a spring of the sort illustrated in the drawing and shown in detail in Figure 6 of the drawing. This spring comprises a sinuous length of wire or ribbon made of a springy material and bent into substantially circular form so as to fit within the groove 20.

I prefer also to so construct and arrange the piston packing as to minimize, or even entirely eliminate, the possibility of the spring tending to move within the groove 20 and of the packing tending to move within its own groove. For this purpose, I prefer to roughen, or even to provide with teeth or corrugations, the upper and lower peaks of the sinuous spring 21, as shown more clearly in Figures 2 and 6 of the drawing. The arrangement is such that the upper corrugations, teeth, roughnesses, or other indentations, 25 cooperate with the upper face of the annular groove 20 to prevent the spring from moving within said annular groove, while the lower corrugations, teeth, roughnesses, or other indentations, cooperate with the lower face of the piston groove to prevent the packing from moving within said piston groove. This arrangement is all the more facilitated in those cases where, as is preferred, the spring is made of a hard, springy, material, such as a hardened, tungsten or other steel, while the piston and the ring are each made of a softer, generally a cast, metal.

Associated with the ring 17 and preferably adjacent the split 18 therein, I provide means for locking the ring against undue expansion of the same when the piston carrying the packings in its grooves is removed from the cylinder. For this purpose, as more clearly shown in Figures 3 and 4 of the drawing, I provide a locking member 27 in the form of a tongue having a shank portion 28 fitting into a grooved indentation 29 in the end 30 of the split ring 17. The member 27 is rigidly attached to the end 30 by means of rivets or other suitable fastening devices 31. The member 27 is provided with a raised hook portion 32 for cooperation with a detent or locking portion 33 on the other end 34 of the ring 17.

This end is provided with a grooved or cut-away portion 35 so shaped as to provide the member 27 with the necessary room for play during the contraction and expansion of the packing when inserted into or removed from the piston groove, or when the piston carrying the packings in its grooves is removed from or inserted into its cylinder.

The mode of operation and the use of the packing described above may be briefly set forth as follows: When the packing is to be inserted in its groove in the piston, the locking members 32 and 34 are opened to permit the split ring to be slipped into the groove, in which position the locking members may be once more brought into locking position to limit the degree of expansion of the ring when the piston carrying the packing is removed from the cylinder. During the insertion of the ring, the spring 21 is intially put under pressure to enable the ring, the width of which is about equal to the width of the groove in which it is to be locked, to be slipped into said groove. This action places the spring under pressure so that the packing is now retained within the piston groove under substantial pressure.

In this arrangement of the parts the piston is provided with packings which are held under spring pressure within their respective grooves, thus eliminating the possibility of excessive wear of the packings and their grooves. At the same time the spring is so constructed as to substantially avoid likelihood of its moving or creeping within its groove, and further likelihood of the packing moving or creeping as a whole within the piston groove. The locking means at the same time substantially prevent the packing from expanding to such a degree, when the piston is removed from the cylinder, as to cause the packing to become dislodged from its groove and thus increase the difficulties of shipping and assembling the packings within their grooves. This construction has the further advantages that it prevents the packing ring from "going dead" or losing its resiliency due to excessive heat or long service, and acts also to prevent the ring from "scoring" or otherwise damaging the cylinder walls should the ring break in operation. In such an event, the spring will help maintain the broken parts of the ring in alignment under permissible working conditions within the piston groove.

In Figures 8 and 9 of the drawing, I have illustrated a modification of the above device in connection with which, instead of providing the lower face of the ring with a substantially annular groove in which a sinuous, substantially circular spring is locked, I prefer to employ a ring, here designated by reference character 37, which is provided with a plurality of depressions 38 in which are rigidly fastened, by means of rivets 39 passing through the shank portions 40, a plurality of, herein shown as six, leaf springs 41. The outer free ends of the springs 41 are provided with corrugations, teeth, or other roughnesses or indentations 42 to prevent the ring 37, when inserted in the piston groove, from moving within such groove.

In Figure 10, of the drawing, I have shown a modified locking device which may, for example, be used in connection with the form of ring shown in Figures 1 to 7, inclusive, of the drawing. In the form of locking device shown in Figure 10, the split in the ring, which is indicated by reference character 47, is diagonally disposed, as shown at 48. The locking member 49 has a shank portion 50 through which pass a plurality of rivets or other fastening devices 51 for rigidly maintaining the shank portion 50 within a groove 52 in the lower face of the ring 47 adjacent the split 48. The other end of the member 49 is provided with a raised locking or hook portion 53 which cooperates with a detent or catch portion 54 and with a groove 55 for providing free play for the member 53. In this way, the locking means, while permitting the necessary adjustment of the ring during its insertion into or removal from the piston groove, and during the manipulation of the piston carrying the piston packings into and out of the cylinder bore, provide for the necessary free expansion and contraction of the ring, while at the same time limiting the degree of expansion of the ring when removed from its groove or when removed with the piston from the cylinder bore.

What I claim is:

1. A piston packing for the grooves of pistons for the cylinders of internal combustion engines and the like, comprising a resilient split ring adapted to expand into contact with the cylinder bore by its own resiliency, said ring having a substantially annular groove in its lower face, and spring means within said annular groove for maintaining the ring under spring pressure within the piston groove, said spring means being provided with means for substantially preventing the creeping of said spring within said annular groove and of said ring within said piston groove.

2. A piston packing for the grooves of pistons for the cylinders of internal combustion engines and the like, comprising a split packing ring adapted to contact with the cylinder bore, said ring having a substantially annular groove in one side face, and a ring within said annular groove provided with roughened faces adapted to have a frictional contact with the piston groove wall to prevent creeping of the ring in the groove.

3. A piston packing for the grooves of pistons for the cylinders of internal combustion engines and the like, comprising a split ring adapted to contact with the cylinder bore, said ring having a substantially annular groove in one side face, and a sinusoidal ring within said annular groove provided with roughened faces adapted to have a frictional contact with the piston groove wall to prevent creeping of the ring.

4. A piston packing for the grooves of pistons for the cylinders of internal combustion engines and the like, comprising a split packing ring adapted to contact with the cylinder bore, said ring having a substantially annular groove in one side face, a ring within said annular groove of sinusoidal outline with roughened faces on both sides adapted to have a frictional contact with the said ring and also with the piston groove to prevent creeping of the rings in the piston groove.

5. In a packing for a piston groove, the combination of a spring packing ring, and a split spring ring interposed between said ring and one side wall of the piston groove and arranged to force the packing ring toward the opposite side wall of the groove, and inner spring ring being roughened on opposed faces to frictionally engage the said outer ring and the other groove wall respectively, whereby to prevent creeping of the rings in the piston groove.

6. The combination with a piston ring having a groove in one lateral face thereof; of a convoluted spring ring held in said groove and having the convex of its convolution roughened to provide friction surfaces.

7. The combination with a piston backing ring having a groove in one of its lateral faces; of a spring ring held in said groove and having spaced roughened portions on its opposite faces respectively engaging the bottom of the groove and engageable with a side wall of a piston groove.

In testimony whereof, I have signed my name to this specification this 10th day of January, 1922.

FRANK E. SMALL.